United States Patent
Becattini et al.

[11] 3,871,101
[45] Mar. 18, 1975

[54] ARRANGEMENT IN A DRAFTING MACHINE FOR PRECISE MEASUREMENT OF ANGLES

[76] Inventors: Angiolo Becattini, via del Cantone 5; Pietro Angelo Sassi, S. Casciano Val DI Pesa (FI)-La Romola, both of Florence, Italy

[22] Filed: July 18, 1973

[21] Appl. No.: 380,167

[30] Foreign Application Priority Data
July 19, 1972  Italy .................................. 9594/72

[52] U.S. Cl. ............................................ 33/79 R
[51] Int. Cl. ............................................ B43l 13/02
[58] Field of Search .................. 33/79, 1, 166, 76 R

[56] References Cited
UNITED STATES PATENTS
2,743,699  5/1956  Hollis .............................. 33/166 X
3,131,478  5/1964  Snurr .............................. 33/79 R

*Primary Examiner*—Harry N. Haroian

[57] ABSTRACT

An arrangement used in conjuction with universal drafting machines for precise measurements of angles, in which a support is moveable parallel to a predetermined direction. The support carries an angularly moveable element together with a goniometer, with two scales and an index for direct reading of angles. The angularly moveable element is provided with a positioning grip and has a hollow shaft mounted within the support through a cavity having a reading window on a cover of the instrument. A disk is mounted coaxial with the tubular shaft and bears graduations corresponding to a fine scale which may be read through the window. A preferably speed multiplying transmission connects the shaft to the disk carrying the fine scale. Integral with the shaft there may be another disk having a coarse scale engraved thereon.

7 Claims, 9 Drawing Figures

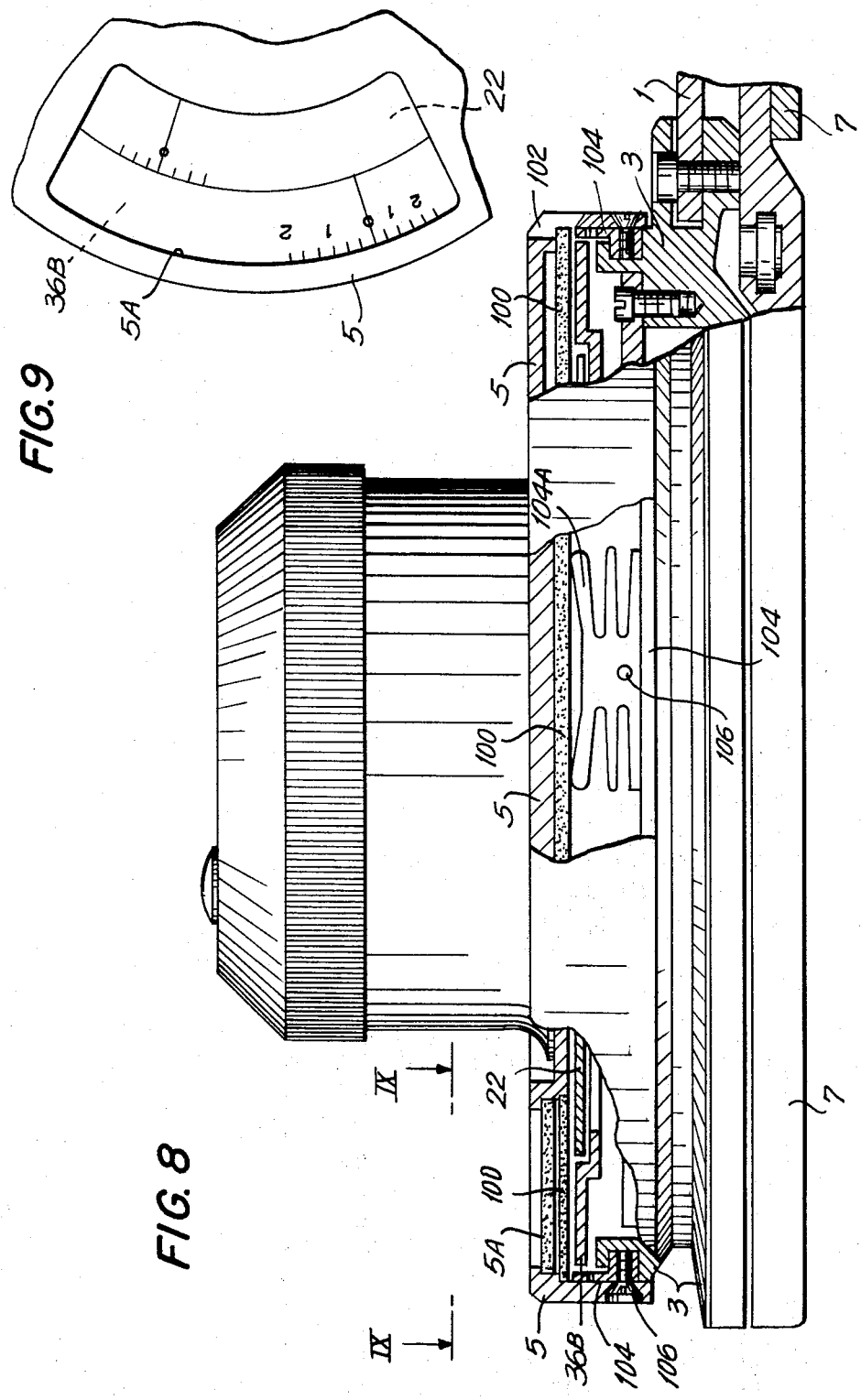

ARRANGEMENT IN A DRAFTING MACHINE FOR PRECISE MEASUREMENT OF ANGLES

BACKGROUND OF THE INVENTION

The present invention relates to an arrangement for angular positioning of a universal drafting machine which is equipped with a protractor or goniometer for the precise measurement of angles. The arrangement includes a base member which is equipped with a protractor or goniometer for the precise measurement of angles. The arrangement includes a base member which is moveable parallel to itself or to a predetermined direction with rods joined in a parallelogram shape or other guiding means. An angular grip or knob is on the base member and bears coarse graduations. An index co-operates for the direct measurement of the angular movements between the grip and the base. A second or fine graduation is provided in conjunction with a speed multiplying transmission which multiplies the motion of the angles rotated through by the grip.

Arrangements of the above kind are complex in design, difficult to operate, and are unreliable in service.

Accordingly, it is an object of the present invention to provide an arrangement for precise measurement of angles in a universal drafting machine which is simple in design and does not require substantial skill to be applied by the user.

Another object of the present invention is to provide an arrangement of the foregoing character which is reliable in operation and may be readily maintained.

A still further object of the present invention is to provide an arrangement which may be economically fabricated and easily assembled.

SUMMARY OF THE INVENTION

The objects of the present invention are achieved by providing an arrangement in which a support is moveable parallel to a predetermined direction or parallel to itself. A moveable element is carried by this support in an angularly moveable manner, together with a positioning grip, a goniometer or protractor with a scale and an index for the direct reading of angles. The angularly moveable element is in the form of a tubular shaft installed within the support through a cavity, provided with a reading window in the support. The cavity, furthermore, houses a speed multiplying transmission which connects the tubular shaft to a disk that is coaxial with the shaft and bears graduations corresponding to a fine scale which is visible through the reading window.

In a preferred embodiment of the present invention, the tubular shaft is integral with a device bearing the graduations for direct measurement of angles. The direct measurements of such angles can be read through the same window displaying the fine scale.

In accordance with the present invention, furthermore, a covering member is provided on the support and is moveable relative to the support. The covering member is provided with a reading window which is angularly adjustable for the selection of the desired positioning origins of the angles to be measured.

The fine scale can be carried on an element sliding through frictional means relative to a last stage of the speed multiplying transmission, in order to assure resetting in any desired position.

In a recommended embodiment of the present invention, the tubular shaft is integral with the grip and has mounted in its interior an auxilary shaft which can be positioned by means of a push button housed in the grip and carrying an arm which, in turn, controls a locking part with a fulcrum or pivot on a disk made integral with the grip. This latter disk may be made a gear constituting a first stage of the speed multiplying transmission. The locking part on the disk co-operates with a stationary ring gear having locking notches.

The novel features which are considered as characteristic for the invention as set forth in particular in the appended claims. The invention itself, however, both are to its construction and method of operation, together with additional objects and advantages thereof, will be best understood from the following description of specific embodiments when read in connection with the accompanying drawings.

BRIEF DESCRIPTION OF THE DRAWING

FIG. 8 is a side view of the grip assembly with parts broken away; and

FIG. 9 is a partial plan view taken along line IX—IX in FIG. 8.

DESCRIPTION OF THE PREFERRED EMBODIMENTS

Figure 1:
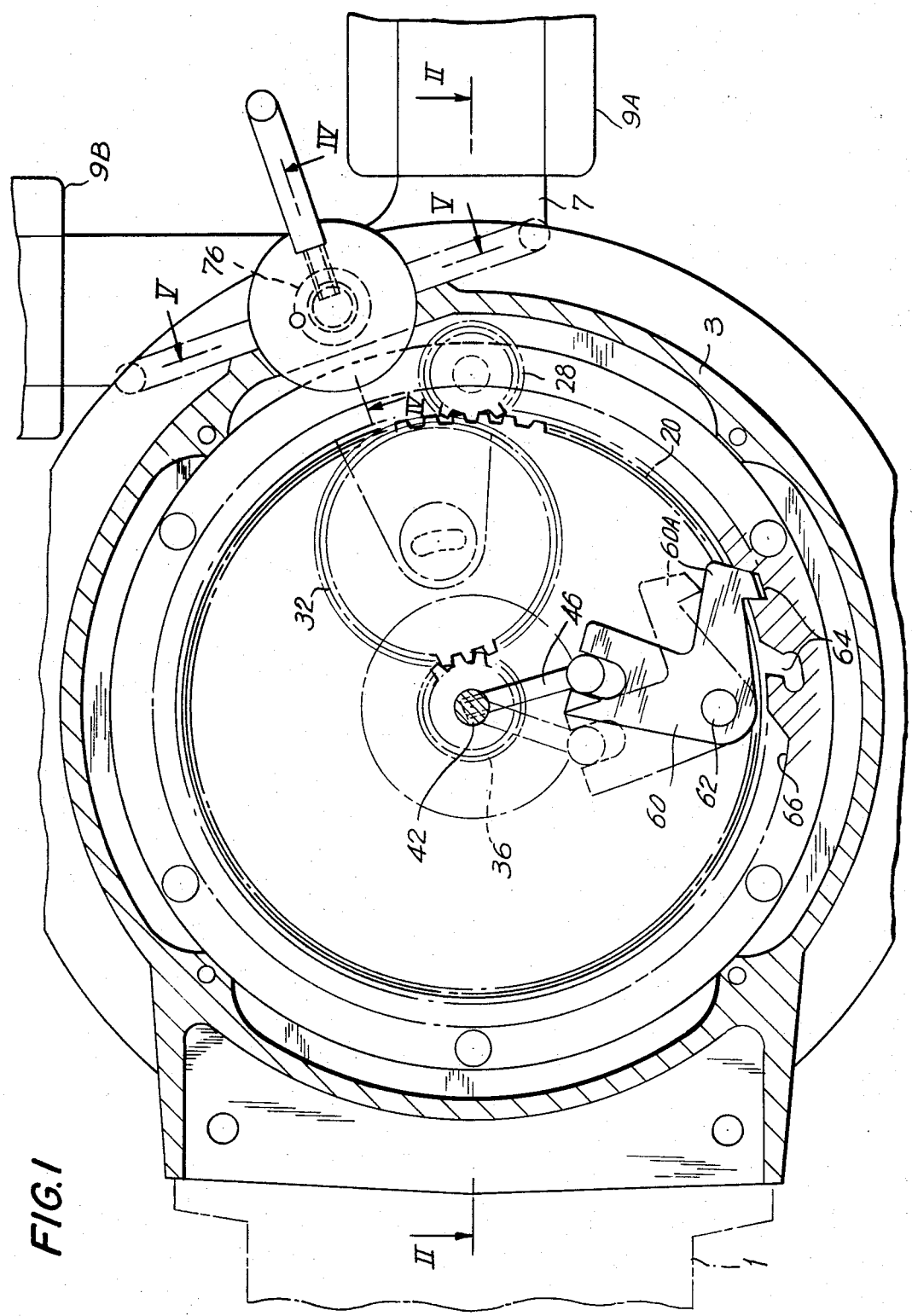
FIG. 1 is a plan view and shows a grip assembly in the inventive arrangement in a drafting machine, together with goniometers for approximate and precise measurement of angles, in accordance with the present invention.
Figure 2:
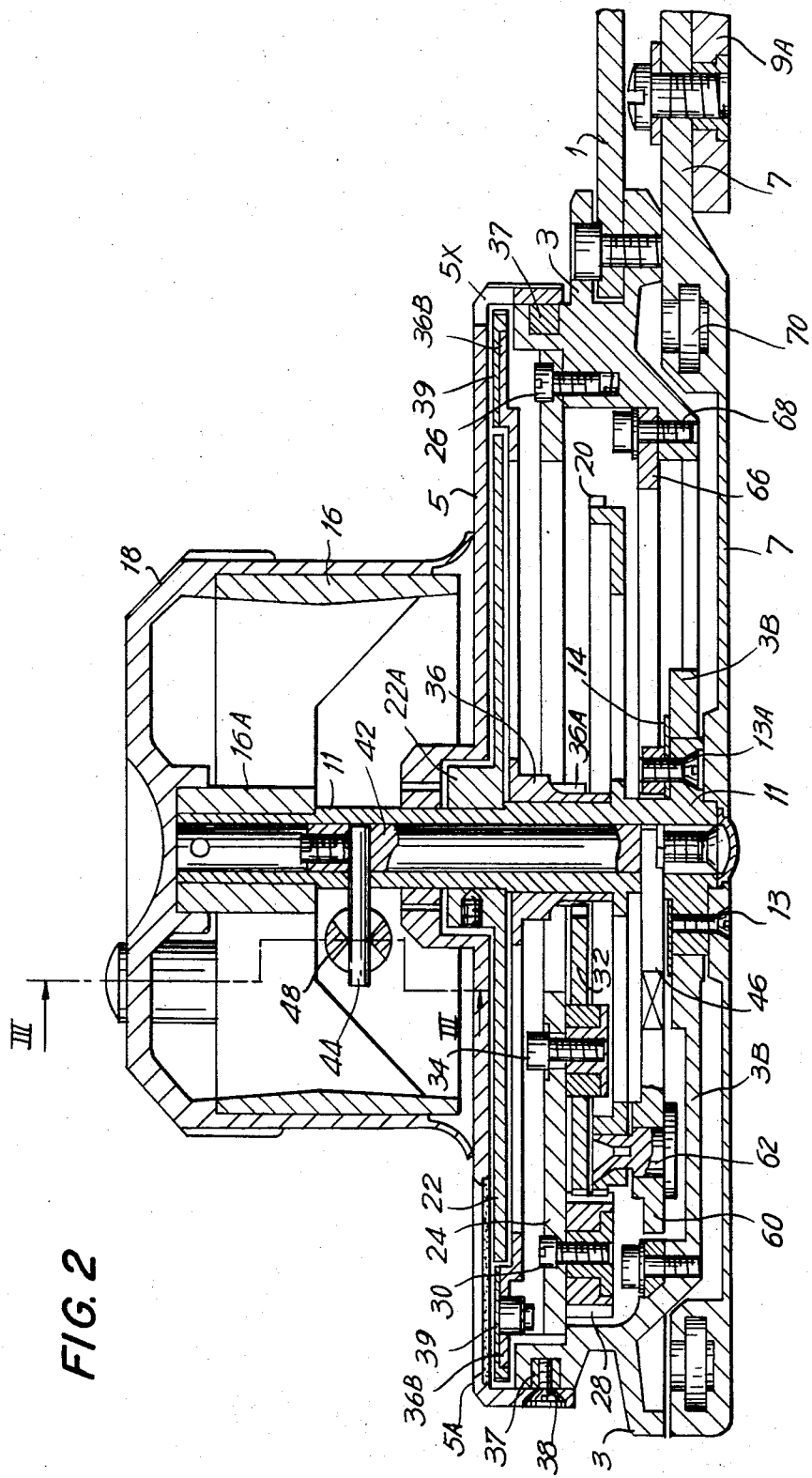
FIG. 2 is a sectional view taken along the line II—II in FIG. 1.

Referring to the drawing, a support element 1 in the universal drafting machine, in accordance with the present invention, is always moveable parallel to a predetermined direction. The support element 1 is joined to a member 3 which becomes, thereby, also moveable parallel to that predetermined direction. The member 3 is adapted to support the entire unit with right angle lines or scales and the positioning knob or grip with the angle reading system. The member 3 operates in conjunction with a cover 5 having a window 5A for slow and rapid reading scales corresponding to coarse and fine measurements.

The member 7 is angularly moveable relative to the member 3, and carries two scales or straight-edge elements 9A and 9B at right angles to each other.

The member 7 is connected to a sleeve 11 by screws 13. Screws 13A, furthermore, connect a plate 14 rotatingly with the sleeve 11. As a result, the member 7 is connected to a portion 3B of the member 3. The sleeve 11 is in the form of a tubular or hollow shaft member which extends to engage the hub 16A of a member 16. This member 16 carries a knob 18 for angular positioning. The knob 18, therefore, serves as a grip for positioning the lines of scales 9A and 9B. The elements 18, 16, 11, 7, 9A and 9B constitute an angularly moveable arrangement. A disk 20 provided with teeth is, furthermore, made integral with the angularly moveable arrangement.

The angularly moveable arrangement, moreover, is made integral or connected to a disk 22 through a hub 22A. The disk 22 is graduated to correspond to a coarse scale with motion corresponding to the angular motion of the knob 18. This scale is visible within the portion of the window 5A closest to the grip 18.

The member 3 is connected to a part 24 which supports a multiplying wheel mechanism, to be described. The part 24 is held in place by means of screws 26. A gear or pinion 28 is held in place by means of a screw 30 which joins the pinion 28 to the part or member 24. The pinion 28 is in mesh with a geared disk 20. At the same time, the pinion 28 also meshes with an idler gear 32 mounted in place in an adjustable manner by means of a screw 34 which fastens the wheel 32 adjustably to the part 24. The idler gear 32 meshes with the gear teeth 36A of a hub 36 installed in a mutual position on shaft 11 and forming an annular gear or ring gear 36B. This gear 36B carries a fine graduated scale 39 which may be seen through a portion of the window 5A. The scale 39 surrounds the periphery of the disk 22 corresponding to the coarse scale, and can be angularly adjusted relative to the ring gear 36B in a manner to be described below. By means of the transmission ratio inherent in the mechanical drive linkage 20, 28, 32, 36A, it is possible to amplify the angular motion of elements 7, 11, 16 with scales or straight-edge elements 9A and 9B, relative to the member 3. The accuracy of the reading is, furthermore, increased by the magnitude of the diameter of the graduated ring gear 39.

In view of the description above, the transmission within the structure or parts 7, 5 serves to amplify or magnify the angular motion of the knob or grip 18, as well as the two graduated scales carried by the disk 22 and ring gear 39. The reading may be made through the same window 5A, and it is also possible to use radially aligned indexes in conjunction with the reading.

The index or indexes carried by the window 5A may be varied in angular position for the purpose of varying the initial setting or reference point in accordance with the user's requirements. The covering element 5 is, for this purpose, engaged in an angularly adjustable fashion relative to the member 3. A friction ring 37 is provided attached to the member 5 by means of screws 38. The friction ring 37 is housed in an external annular seat in the member 3. It is, accordingly, possible to regulate the positions of the indexes in co-operation with the scales formed by disk 22 and ring gear 39.

Figure 6:
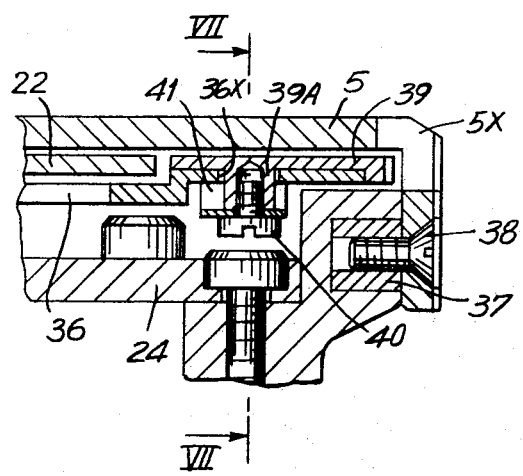
FIG. 6 shows the detailed structure of a part of FIG. 2.
Figure 7:
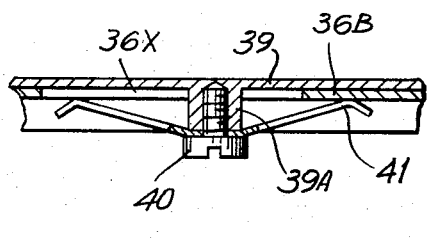
FIG. 7 is a partial sectional view taken along line VII—VII in FIG. 6.

To assure proper positioning of the fine scale relative to the coarse scale, the former is formed or generated by the ring gear 39 on the ring gear 36B. The ring gear 39 is friction mounted on the ring gear 36B. The ring gear 36B, moreover, is provided for this purpose with curved slots 36X (see FIGS. 6 and 7), and each of these slots is traversed by a hub 39A projecting from the ring gear 39 and engaging or accommodating a screw 40. This screw 40 serves to attach a leaf spring 41 tightly against the hub 39A, so that the arms or ends of the leaf spring bear against the undersurface of the ring gear 36B to assure sufficient friction between the ring gear 36B, 39. To position the ring gear 39 of the moveable scale, the latter may project with a knurled edge from a window or opening in the form of a cavity or opening 5X in the member 5.

Figure 3:
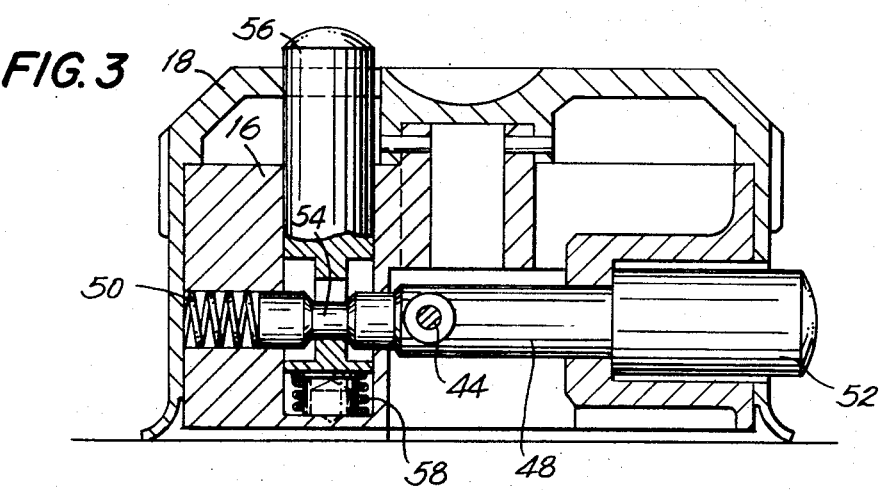
FIG. 3 is a sectional view taken along line III—III in FIG. 2.

The shaft 11 is constructed in the form of a hollow member for the purpose of housing a control drive which locks members 7, 11, 16, and 18 in a predetermined desired angular position relative to the member 3. Within the shaft 11 is housed, for this purpose, a small shaft 42 which carries an upper arm 44 and a lower arm 46. The upper arm 44 is linked to a stem or shaft portion 48 mounted transversely across the assembly 16, 18 of the knob or grip. To allow relative tilting of the arm 44 with respect to the stem 48, the latter is provided with a hole and two inverted bevels defining a central pinched arrangement. The stem 48 is urged in one direction by a spring 50 (see FIG. 3). The stem can be moved controllably in the opposite direction by means of a push button 52 actuated by the operator. The stem or shaft portion 48, furthermore, is provided with a necked-down portion 54 which cooperates with a slot carried by a push button 56 which is springloaded by a spring 58.

The arrangement including elements 54, 56 and 58 forms a unit which allows the positioning of the stem or shaft portion 48. This, in turn, positions the arm 44 and the shaft 42 in a predetermined position against the action of the spring 50. The push button 56 may be depressed against the action of the spring 58 to allow operable movement of the spring 50. By means of push buttons 52, 56, therefore, it is possible to position the shaft 42 and therefore the lower arm 46, for the purpose of bringing it at least into two predetermined positions in which the grip is an engagement and disengagement relative to the member 3.

The arm 46 enters a longitudinal slot of one of the two arms of an angled 45° lever 60 which is fastened by means of a pivot 62, to the disk 20 of the ring gear meshing with the gear 28 and integral with the shaft 11 and thereby also with the part 7. The angled 45° lever 60 follows the support 7 (of which the geared disk 20 is a part) on the arm opposite to that slidingly engaged with the arm 46. A tooth 60A on the lever 60 enters one of several notches 64 provided in predetermined angular positions along the ring gear 66 which is fastened by means of screw 68 to the member 3.

It is, accordingly, possible to accomodate preferential and conventionally desired angular positions in which the arrangement may be locked in accordance with the drawing requirements. Thus, the notches 64 can correspond, for example, to angular positions of 30°, 45°, 60° and other such preferred and used positions.

By actuating push buttons 52 and 56, it is possible to lift the tooth 60A from one of the notches 64 and to insert it into another notch.

Figure 4:
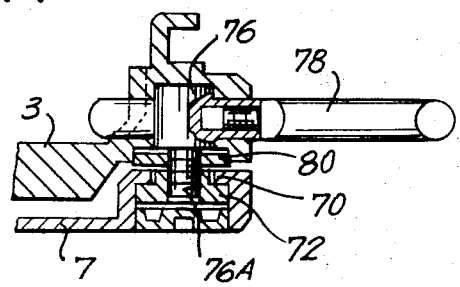
FIG. 4 is a partial sectional view taken along line IV—IV in FIG. 1.
Figure 5:
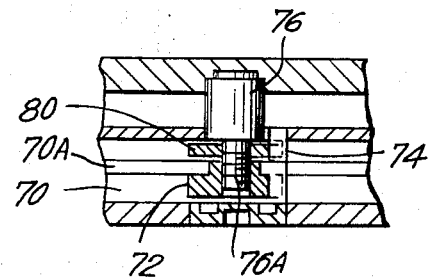
FIG. 5 is a partial sectional view taken along line V—V in FIG. 1.

The positioning of members 7 and 11 relative to the member 3 in angular positions different from the preferred ones, available from the notches 64 and tooth or pawl 60A, may be obtained from the arrangement 60, 46, 42, 44, and 48, after executing proper disengagement and making the adjustment by means of a friction lock. For this purpose, the support member 7 has an annular channel 70 (see FIGS. 4 and 5) in which a sleeve-shaped element 72 can slide due to the angular positioning of the grip or knob 18. The element 72 is secured against rotation by means of a key or plug 74 (FIG. 5) and is fastened by means of a screw to the threaded stem portion 76A of a shaft unit 76 in the arrangement 3. The shaft unit 76 can be positioned from the outside by a lever arm 78 radially inserted into the shaft unit 76.

A disk 80 is mounted on the threaded stem portion 76A and engages angularly the plug or key 74. By positioning the arm 78 in this arrangement, it is possible to move the shaft unit 76 and to fasten or release the element 72 so as to force this element 72 toward the disk 80 for the purpose of tightening the edge 70A of the channel 70 and thereby lock member 7 in place to the member 3. In the reverse positioning, the element 72 and the disk 80 are loosened, so that the element 72 may be then moved angularly. As a result, it is possible to lock the element 72 in any desired position relative to the member 3, regardless of the positioning of the notches 64 and the tooth or pawl 60A.

In accordance with the arrangement of FIGS. 8 and 9, the fine scale is shown on the exterior of the disk 36B and integral with the hub 36. This scale is visible through the window 5A provided in the covering or member 5. In particular, the fine scale is visible in the outermost peripheral rim in the window 5A. The coarse scale on the disk 22 is visible along the innermost rim of the window 5A. Within the member 5 and underneath the window 5A is a sliding flat annular element which is transparent and which may be moved angularly through a window 102 provided along the sharp edge of the member 5. The arrangement causes a section of the periphery of element 100 to project so that it is possible to contact its external edge for angular positioning.

The element 100 is retained in its seat, and sufficient friction is applied to this element 100 to assure a predetermined amount of frictional resistance to angular movement. Elements 104 are provided for this purpose in the form of curved plates installed in member 5 by means of screws 106 corresponding to those 38. These plateshaped elements 104 have leaf-shaped elastic fingers 104A which serve to press the element 10 adequately and elastically against the interior of the member 5 in order to provide the proper amount of friction. The elements 104 also provide for the proper amount of friction between the member 5 and the member 3.

On the viewing glass of the window 5A, there is an index corresponding to the coarse scale for the purpose of co-operating with the coarse scale on the disk 22. At least one other index is carried by the annular element 100, which is intended to co-operate with the fine scale. Various spaced indexes may also be provided, depending on the graduation that can be used for the fine scale.

With the arrangement, in accordance with the present invention, it is possible to obtain the resetting of the scales at multiple initial positions of the fine scale, in addition to the resetting of the coarse scale in any desired angular position to accommodate the variety of lines to be drawn by a universal drafting machine.

In the case of predetermined angular positions, it is possible to hold in allignment not only the initial positions or origins, but also the indices. In the case of initial positions or origins with any angular positions, it is possible to reset the coarse scale as well as the fine scale by actuating the member 5 and then the element 10. The member 5 and element 10 remain stationery relative to each other thereafter while the universal drafting machine is in use, since they are related to each other in a manner whereby they will not be subject to inertia effects or driving effects.

FIG. 9 shows a position assumed by the scales with any desired origin and with the indices moved to reset positions.

Without further analysis, the foregoing will so fully reveal the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the spirit and scope of the invention.

What is claimed is:

1. An arrangement in a drafting machine for precise measurement of angles comprising, in combination, a support moveable parallel to a predetermined direction; an angularly moveable element carried by said support and having a positioning grip; a goniometer including two coaxial scales, a coarse and a fine scale, rotatable relative to each other according to a given ratio, wherein said scales can be read through a window on a cover of the instrument and provided with a reference line; and a transparent disk mounted on said cover under said window, having a second reference line usable in connection with said first-named line on the window; said disk being in turn angularly adjustable relative to said cover; the whole assembly being angularly adjustable to allow, in conjunction with said disk, to shift the readings of origins of angles to be measured; said support including a central, hollow shaft forming the rotational axis of said scales and containing in addition in its inner portion elements of a mechanical transmission, allowing a locking device of a mobile part to be controlled from said grip to assume given angular positions; said goniometer providing instant angle readings in degrees and minutes, directly and without a vernier being needed; and said goniometer being provided for attachment to any type of universal drafting device by means of a suitable connector.

2. The arrangement as defined in claim 1, further comprising an auxiliary disk integral with said shaft and having graduations corresponding to direct measurements of angles, said graduations appearing through said window.

3. The arrangement as defined in claim 1, further comprising means for carrying said fine scale on said transmission; and friction means applied to said fine scale for holding the latter against unintended rotation.

4. The arrangement as defined in claim 1, further comprising an auxiliary shaft mounted within said hollow shaft; a push button in said grip and carrying an arm for positioning said auxiliary shaft; a gear corresponding to a first stage of said transmission, the latter being in the form of speed multiplying transmission, said gear having a locking element with a pivot controlled by said arm; and a stationary ring gear with locking notches cooperating with said locking element.

5. The arrangement as defined in claim 1, wherein said transmission is constituted by a speed multiplying transmission.

6. The arrangement as defined in claim 1, wherein said window is angularly adjustable for the selection of the positioning of the origins of angles.

7. The arrangement as defined in claim 1, further comprising frictional means between said cover and said support.

* * * * *